(12) United States Patent
Beasley

(10) Patent No.: US 6,361,217 B1
(45) Date of Patent: Mar. 26, 2002

(54) HIGH CAPACITY THRUST BEARING

(76) Inventor: Thomas R. Beasley, 706 Enford Ct., Katy, TX (US) 77450

( * ) Notice: Subject to any disclaimer, the term of this patent is extended or adjusted under 35 U.S.C. 154(b) by 0 days.

(21) Appl. No.: 09/338,259

(22) Filed: Jun. 22, 1999

(51) Int. Cl.[7] .............................................. F16C 32/06
(52) U.S. Cl. ....................................... 384/124; 384/121
(58) Field of Search ................................. 384/124, 121, 384/101, 107, 304

(56) References Cited

U.S. PATENT DOCUMENTS

| | | |
|---|---|---|
| 971,849 A | 10/1910 | Krogh et al. |
| 1,122,051 A | 12/1914 | Wohlenberg |
| 3,058,510 A | 10/1962 | Tiraspolsky et al. ........... 253/3 |
| 3,578,232 A * | 5/1971 | Loyd et al. |
| 3,866,988 A | 2/1975 | Streigler |
| 3,958,187 A | 5/1976 | Mothre .......................... 173/73 |
| 4,098,359 A | 7/1978 | Birdwell ....................... 175/93 |
| 4,227,865 A | 10/1980 | Erickson et al. ............. 417/365 |
| 4,610,319 A | 9/1986 | Kalsi ............................ 175/371 |
| 5,230,520 A | 7/1993 | Dietle et al. ................. 277/134 |
| 5,286,114 A | 2/1994 | Raphael ....................... 384/121 |
| 5,713,558 A | 2/1998 | Junkers ....................... 254/29 A |

* cited by examiner

Primary Examiner—Lenard A. Footland
(74) Attorney, Agent, or Firm—Howrey Simon Arnold & White LLP.

(57) ABSTRACT

A high capacity thrust bearing is disclosed for use in a tubular drilling string to support axial loads resulting from upward or downward jarring forces. The thrust bearing comprises an inner mandrel and an outer housing. A mandrel pressure chamber string and a housing pressure chamber string are journalled between the mandrel and the housing. The mandrel pressure chamber string and the housing chamber string are arranged to form a number of individual pressure chambers. Alternating pressure chambers contain high pressure fluid or low pressure fluid, thereby forming a repeating pressure differential between adjacent chambers. As loads are applied axially to the drill string, such as jarring loads, the pressure differential over the surface area of the pressure chambers provides a thrust bearing. The thrust bearing is rotatable by its connection to the drill string.

19 Claims, 4 Drawing Sheets ic HIGH CAPACITY THRUST BEARING

BACKGROUND OF THE INVENTION

In the course of drilling oil wells, there have been occasions when being able to rotate the upper part of the drill pipe string while the lower part is stuck or stationary would be desirable. Being able to rotate the upper string while jarring on the stuck lower string would tend to keep the upper string from getting stuck. Disengaging the upper and lower segments of the drill pipe string can be accomplished through a clutch or coupling, which may be operated from the surface, or by a torque limiting device that would slip to keep from twisting off the lower string when it gets stuck or over-torqued.

Those who are schooled in the art can design both of these devices. The problem is designing a rotary thrust bearing that will operate under the high loads imposed by the long drill string.

In addition to the load imposed on the thrust bearing by the drill string itself, there are additional axial thrust loads imposed. For example, many times when drilling hard formations, the drill bit bounces off the bottom of the hole. This sends vibrations up the string that add to the thrust bearing load. In addition, when jarring, the tension and release of the jarring action on the drill string increases the load by as much as three times the static load.

Traditionally, designers have used ball bearings or roller bearings for this service. However, due to the restricted outside diameter imposed by the hole size, the bearings have been stacked in parallel to achieve the required capacity. Stacking in this manner requires some provision for the bearings to equally share the load. This has been done by using springs and elastomers with varying success.

Problems associated with the use of ball or roller bearings generally occur not when they are rotating but when they are not rotating. For example, the constant vibration of drilling can cause the balls or rollers to brinell the races in one spot. Brinelling is the process of making a small dent in the race where each ball or roller rests. This causes the bearing to run rough when it does rotate, reducing the life of the bearing. Brinelling also causes cracking and breaks off small portions of the brittle balls and races which further reduces the useful life of the bearing.

A hydrodynamic bearing eliminates the brittle balls or rollers and uses a fluid such as oil to keep the races separated. Previous fluid bearings, such as the one described in U.S. Pat. No. 5,286,114, use an external fluid and pressure source. Bearings of this type depend upon a thin fluid film for friction reduction and a seal. However, the bearing loses a considerable amount of fluid through this seal, which must continuously be refreshed from the external source. Moreover, extremely close tolerances are required to maintain the same film thickness across each pair of races.

SUMMARY OF THE INVENTION

The present thrust bearing invention provides the required axial thrust bearing capacity to allow a drill pipe string to be separated into rotating and non-rotating sections and absorb the imposed thrust loads. A clutch, torque limiter, or other release mechanism is located in the string between the thrust bearing and a section of drill pipe string to selectively prevent torque transfer between the sections of drill pipe string and thus permit relative rotation. The thrust bearing allows an upper or lower drill string section to rotate relative to the other non-rotating section. While doing so, the thrust bearing invention eliminates the continuous outside pressure and fluid source requirement, and reduces the extreme tolerance requirements of previous hydrodynamic bearings.

The thrust bearing of the current invention contains a series of alternating relatively high and low pressure chambers (at least two) defined by pairs of races, or pressure chamber segments, journalled between a housing and a mandrel. An axial bore allows fluid flow through the thrust bearing.

Each pressure chamber segment contains one or more seals, and additional seals may be located in the races, in the housing, in the mandrel, and/or in the other elements to reduce the leakage of fluid and loss of pressure associated with prior hydrodynamic bearings. All of the relatively high pressure chambers are ported to a common fluid reservoir, allowing communication of the relatively high pressure fluid and equalization of the pressure throughout the chambers. Similarly, the relatively low pressure chambers may be ported to a common low pressure external fluid, or to a common low pressure fluid reservoir.

The high and low pressure chambers are held in slidable relation within the thrust bearing. The higher pressure fluid is confined to a given volume and is ported to a space between each pair of races which form a single pressure chamber. When a load is applied to the bearing it tends to reduce the space between the pair of races, thus increasing the fluid pressure. Since the high pressure fluid is ported to a common reservoir and each pair of races, the total load capacity of the thrust bearing invention is the sum of the loads carried by each pair of races. Accordingly, the capacity of the thrust bearing may be increased simply by adding pairs of races (pressure chambers) to the bearing. In addition, because the thrust bearing is comprised of a multitude of pressure chambers in a constant diameter tubular mandrel, it provides a fluid bearing at a size compatible with drilling operations.

DESCRIPTION OF ILLUSTRATIVE EMBODIMENTS

Figure 1:
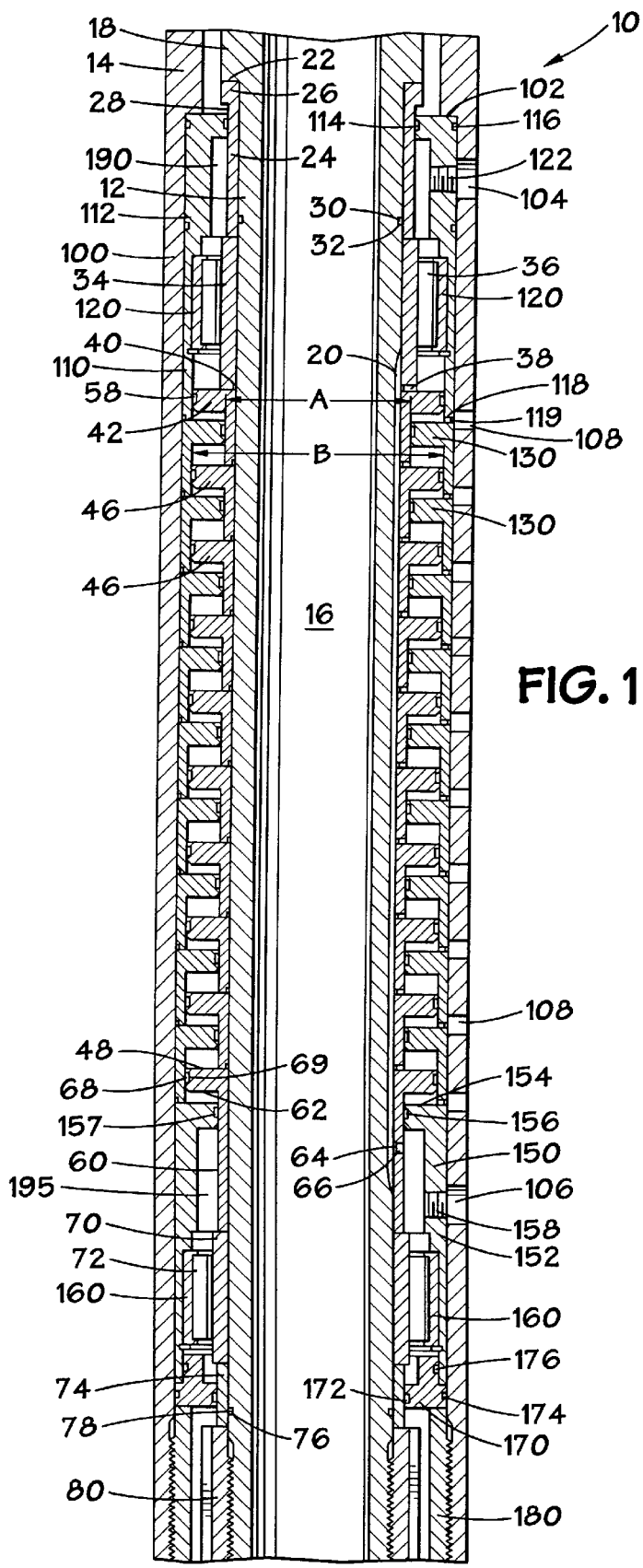
FIG. 1 is a sectional view of an embodiment of the thrust bearing having ten pressure chambers.

Referring now to the drawings, FIG. 1 illustrates a high capacity thrust bearing 10 shown in a sectional view. The thrust bearing 10 generally comprises a first inner component, which in a preferred embodiment is a tubular mandrel 12, supported inside a second outer component, which in a preferred embodiment is a tubular outer housing 14. The mandrel 12 and outer housing 14 each contain a plurality of pressure chambers joined together, and held in place preferably by a threaded inner connection. As a whole, the pressure chambers are comprised of a series of associated components discussed below which are journalled between the mandrel 12 and the outer housing 14, and are referred to as a mandrel pressure chamber string and a housing pressure chamber string.

The tubular mandrel 12 defines a continuous inner bore 16 through which drilling mud or other drilling fluids active in the drill string can be circulated down the drill string. The mandrel 12 may consist of several sections for purposes of assembly and installation, as well as for adjusting the numbers of pressure chambers needed for a given load bearing capacity. In a preferred embodiment, the diameter of the thrust bearing 10 is substantially uniform regardless of the load bearing capacity, since additional capacity results only from additional chambers which add to the axial length of the thrust bearing but not its diameter.

Figure 6:
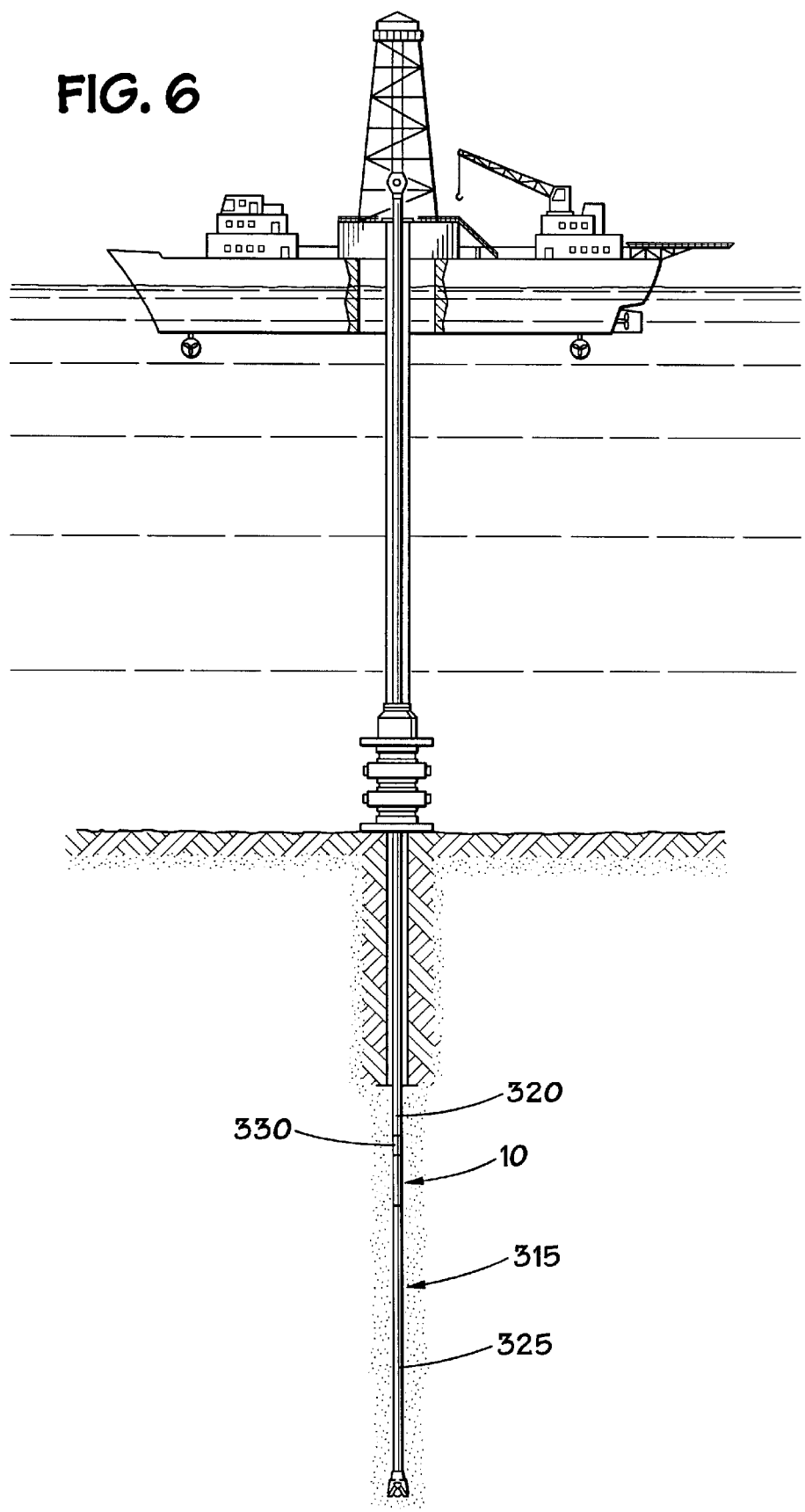
FIG. 6 is a schematic view of a drill string assembly continuing an upper section of drill string, a lower section of drill string, a thrust bearing, and a clutch or torque limiter.

Inner tubular mandrel 12 comprises a tubular mandrel body 18, one end of which is demountably connected to an upper section of a drill string (as shown in FIG. 6). In this embodiment the mandrel 12 drives the rotation of the thrust bearing 10. In other embodiments the outer housing 14 drives the rotation of the thrust bearing 10, thus either component may be the system driver, or be driven. Torque transmission may be accomplished by appropriate connections and torque transmitters, which may be a clutch-type transmission, or dogs, fingers, splines, teeth, belts, gears, couplings or other mechanisms known in the art (not shown).

The thrust bearing 10 may rotate with the drill string when engaged. In addition, the thrust bearing 10 may rotate freely relative to the drill string or freewheel, allowing the portion of the drill string below the thrust bearing 10 to be relatively free of rotation. In this mode, the portion of the thrust bearing connected to the upper section of the drill string, for example the mandrel 12, rotates relative to the outer housing 14 but torque is not transmitted to the outer housing 14. The outer housing 14, demountably coupled to the lower portion of the drill string and/or other tools, is not driven to rotate. Alternately, as noted above, the mandrel 12 may be coupled to the lower section of the drill string, and the outer housing 14 may be coupled to the upper section of the drill string.

The invention is particularly useful in jarring and certain other operations. The engagement or disengagement of the torque transmission mechanism may be hydraulic or mechanical, such as a ball or dart with means to engage or disengage a series of dogs, a torque limiting device, or other means of engagement known in the art.

In subsea drilling applications, the upper portion of a drill pipe string is normally kept in tension by heave compensators at the surface platform, and the drill pipe string is in compression at a lower portion approaching the drilling bit. FIG. 6 shows an illustrative subsea drill string assembly 315 containing an upper section of drill string 320, a lower section of drill string 325, a thrust bearing 10, and a clutch or torque limiter 330.

In a preferred embodiment the thrust bearing 10 is located in the upper tensioned portion of the drill string and, accordingly, is also normally in tension. The invention is also applicable to jack-up applications and to land drilling rigs without heave compensators or tensioners. In addition, the thrust bearing invention may be run in compression.

The inner wall of the tubular mandrel body 18 defines a continuous inner bore 16 of the thrust bearing 10. Tubular mandrel body 18 is shown for clarity as a single piece construction in FIG. 1, however, depending on the length and load demands of the thrust bearing, may comprise multiple sections.

The outer wall of tubular mandrel body 18 has a stepped section which forms a shoulder 22. Shoulder 22 defines the upper locational limit of a mandrel pressure chamber string 24 in the system.

Figure 5:
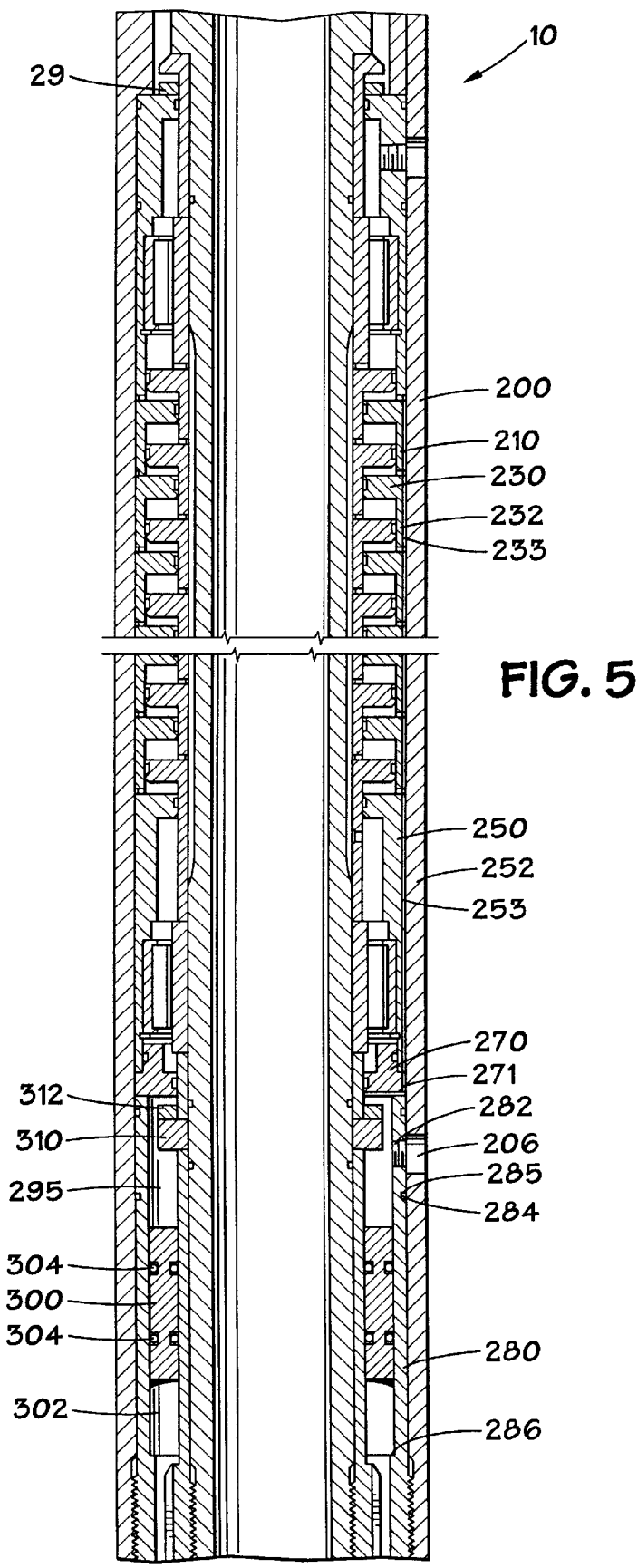
FIG. 5 is a sectional view of an alternate embodiment of the thrust bearing.

Mandrel pressure chamber string 24 has at one end an end segment 26 with a substantially flat surface which abuts shoulder 22. End segment 26 has an external section of reduced diameter 28 which allows for placement of the housing pressure chamber string 110, discussed below. The gap shown in FIG. 1 at reduced diameter 28 is a function of the tension normally applied to the system when run in with the drill string; when the thrust bearing 10 is assembled prior to installation downhole the gap will be minimal or zero. As shown in FIG. 5, a bushing 29 may be installed in the area of reduced diameter 28 between the shoulder of end segment 26 and the housing pressure chamber string 110 to prevent friction wear and damage to these components. In a preferred embodiment, bushing 29 is made of a relatively inexpensive corrosion resistant metal such as bronze.

A seal 30, which may be an O-ring seal or other seals commonly known in the art, is disposed in an upper annular recess 32 in the exterior of mandrel body 18 to provide a fluid seal between the mandrel body 18 and the end segment 26, and prevent leakage of high pressure oil. In one embodiment, end segment 26 abuts a first end of an upper inner radial race 34 for a radial bearing. Upper inner radial race 34 provides the radial bearing surface for roller bearing 36, which also bears upon an upper outer radial race 120, as shown in FIG. 1. In other embodiments, other types of bearings commonly known in the art may be used. The radial bearing capacity of the thrust bearing 10 is not considered essential to the invention. For clarity, because several components may be described as "races," the races of the radial bearing are described as radial races, while the races of the thrust bearing are defined as pressure chamber segments, axial races, or bearing races.

One or more ports 38 through upper inner radial race 34 are radially located about its circumference to provide a flow passage for high pressure oil. An annular groove 40 may be collocated with the one or more ports 38 to allow fluid flow regardless of any radial misalignment between the one or more ports 38 and a plurality of longitudinally extending and radially spaced channels or slots 20 in the exterior of mandrel body 18.

At a second end, upper inner radial race 34 abuts an upper mandrel pressure chamber segment 42. A plurality of intermediate mandrel pressure chamber segments 46 are disposed around the circumference of the mandrel body 18 longitudinally between the upper mandrel pressure chamber segment 42 and a lower mandrel pressure chamber segment 48. For simplicity, FIG. 1 shows an embodiment wherein there are eight intermediate mandrel pressure chamber segments 46, which in conjunction with the upper and lower segments partially define ten pressure bearing chambers. However, the number of pressure chambers segments (bearing races) may be any number suitable to create the desired number of pressure chambers (two or more), and thus the desired load capacity. Axial thrust bearing capacity is a direct function of the number of pressure chambers.

Figure 2:
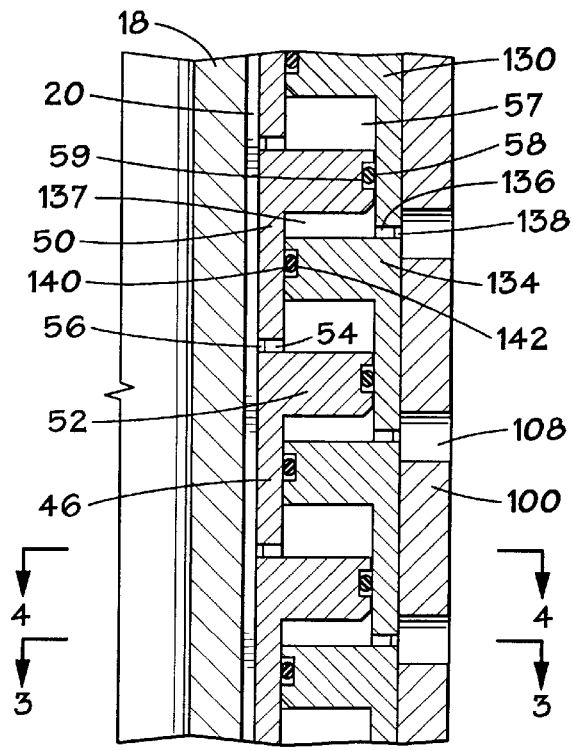
FIG. 2 is an enlarged sectional view of the pressure chambers.

As shown in FIG. 1 and in more detail in FIG. 2, upper mandrel pressure chamber segment 42, and each intermediate mandrel pressure chamber segment 46, consists of a tubular body 50 and an outwardly projecting collar 52. The tubular mandrel body 18 is journalled through the series of pressure chamber segments. FIG. 2 shows the typical arrangement of intermediate pressure chambers in greater detail.

Collar 52 projects laterally away from the tubular body 50 (and from the mandrel body 18). The upper surface of the collar 52 of upper mandrel pressure chamber segment 42 abuts the lower end of upper inner radial race 34, while the upper surface of each collar 52 of each of the intermediate mandrel pressure chamber segments 46 abuts the tubular body 50 of the next adjacently upward intermediate segment. Each of the upper and intermediate mandrel pressure chamber segments 42 and 46 contain one or more ports 54 through the tubular body 50. The ports establish a fluid communication path between the slots 20 in the exterior of mandrel body 18 and high pressure oil chambers 57 (typical). Oil is one embodiment of a fluid that may be used in the current invention, however, many other fluids may be used. An annular groove 56 may be collocated with the one or more ports 54 to allow fluid flow regardless of any radial misalignment between ports 54 and the plurality of slots 20.

Each of the upper and intermediate mandrel pressure chamber segments 42 and 46 also contain a seal 58, or multiple seals. Seal 58 provides a closure to prevent or minimize fluid communication between high pressure chambers and low pressure chambers. Seal 58 may be an O-ring type seal disposed in an annular recess 59 in the exterior of collar 52, or may be another type of seal commonly known in the art which may or may not need to be disposed in a recess. However, in a preferred embodiment, seal 58 is a Kalsi seal, such as those disclosed in U.S. Pat. Nos. 4,610,319 and 5,230,520, both assigned to Kalsi Engineering Inc.

It should be noted that the pressure chambers formed in the invention are substantially sealed, that is, fluid loss from the chambers containing oil is minimized. However, it is not necessary that fluid loss be eliminated entirely.

Near the lower end of the mandrel pressure chamber string 24 is lower mandrel pressure chamber segment 48. Referring again to FIG. 1, the lower mandrel pressure chamber segment 48 consists of a tubular body 60 and an outwardly projecting collar 62. In one embodiment the tubular body 60 of lower mandrel pressure chamber segment 48 is relatively longer than the tubular body 50 of intermediate mandrel pressure chamber segments 46. The collar 62 of lower mandrel pressure chamber segment 48 projects laterally away from the tubular body 60, similar to the intermediate mandrel pressure chamber segments 46. At one end of the lower mandrel pressure chamber segment 48, the upper surface of collar 62 abuts the lower end of the immediately next upper-located intermediate mandrel pressure chamber segment 46. Lower mandrel pressure chamber segment 48 contains one or more ports 64 through the tubular body 60, and an annular groove 66 to provide for fluid communication with the radially spaced slots 20 in tubular mandrel body 18 regardless of angular alignment. Seal 68 is located between, and seals, the lower mandrel pressure chamber segment 48 and housing pressure chamber string 110. Seal 68 may be disposed in an annular recess 69 in the exterior of collar 62, and will typically, though not necessarily, be of the same type and construction as seals 58. In addition, more than one seal may be used.

At the opposing end of lower mandrel pressure chamber segment 48, in one embodiment, the bottom surface of the tubular body 60 borders on a first (upper) edge of a lower inner radial race 70. Lower inner radial race 70 provides a radial bearing surface for roller bearing 72, which also bears upon a lower outer radial race 160, which is part of the housing pressure chamber string 110. Other types of bearings commonly known in the art may be used. A second (lower) edge of lower inner radial race 70 is adjacent to a spacer ring 74. A seal 76 is disposed between the periphery of spacer ring 74 and the outer surface of the mandrel body 18 to prevent or minimize the flow of fluids from the pressure chambers out through the bottom of the thrust bearing 10. In one embodiment, seal 76 is a Kalsi seal located in an annular recess 78 in mandrel body 18, although O-ring seals or other commonly known seals could be used.

Mandrel pressure chamber string 24 may be held in compression against the shoulder 22 of mandrel body 18 by a coupling mechanism located at the lower end of the mandrel pressure chamber string 24. In one embodiment the coupling mechanism is a lock nut 80. Lock nut 80 is internally threaded to fixedly engage external threads on the mandrel body 18, and is located adjacent the spacer ring 74. Accordingly, the inner bearing races/mandrel pressure chamber segments, radial races, and rings that make up the mandrel pressure chamber string may be axially installed over the mandrel body 18 and put into compression against the shoulder 22 by appropriately torqueing the lock nut 80. Other embodiments are envisioned where the coupling mechanism may comprise pins, screws, welds, or other coupling methods known in the art.

The outer tubular housing 14, like the mandrel 12, may consist of several sections. In a preferred embodiment, the outer tubular housing 14 comprises a housing body 100. The inner wall of the housing body 100 has a step which forms a housing shoulder 102. Housing shoulder 102 defines the upper locational limit of a housing pressure chamber string 110. Although shown in FIG. 1 as a single-piece construction, the housing body 100 of outer tubular housing 14 may be comprised of multiple sections. Housing body 100 contains a fill port 104, a bleed port 106, and a plurality of radially spaced lateral fluid ports 108 (typical). The lateral fluid ports may be open to the low pressure fluid outside of the thrust bearing, as shown in FIGS. 1 and 2, or alternately may contain a screen or filter to prevent the introduction of particles or solids into the port and/or the housing pressure chamber string 110.

Housing pressure chamber string 110 has a head member 112. At a first, upper end, head member 112 has a substantially flat upper surface which is positioned against the housing shoulder 102. Head member 112 also contains radial inner seal 114 and outer seal 116, or a plurality of similarly situated seals, each of which may be located in one or more annular grooves as may be desired based on conditions of use and the type of seal desired. Inner seal 114 engages the surface of mandrel end segment 26, while outer seal 116 engages the housing body 100 below the housing shoulder 102. An upper outer radial race 120 is coupled to the head member 112. As discussed above, upper outer radial race provides the radial bearing surface for a radial bearing such as roller bearing 36 shown in FIG. 1.

Upper mandrel pressure chamber segment 42, and its seal or seals 58, are located adjacent to, and bear upon, the head member 112 above one or more radially spaced ports 118. The one or more ports 118 may be collocated with an annular groove 119 to provide fluid communication regardless of radial alignment. In addition, the annular groove is sufficiently axially aligned with at least one of the radially spaced lateral fluid ports 108 in the housing body 100 to allow low pressure fluid from outside the thrust bearing, typically returns of drilling fluid, to flow through the ports into a low pressure chamber.

Situated at the lower end of the head member 112 is a first of one or more intermediate housing pressure chamber segments 130. Referring now to FIG. 2, the intermediate housing pressure chamber segments 130 consist of a tubular body 132 and an inwardly projecting collar 134. The number of intermediate housing pressure chamber segments 130 that are incorporated in the housing pressure chamber string 110 is in relation to the number of intermediate mandrel pressure chamber segments 46, and the number of pressure chambers needed to establish the desired load capacity. In other words, as discussed more fully below, the intermediate pressure chamber segments of the housing and the mandrel correspond to create the pressure bearing chambers and thus the load capacity of the bearing 10.

Referring still to FIG. 2, collar 134 projects laterally away from the tubular body 132 (and inward, away from the housing body 100). The upper surface of each collar 134 of the intermediate housing pressure chamber segments 130 abuts the lower end of each body 132 of the next adjacently upward segment. Each of the intermediate housing pressure chamber segments 130 contain one or more ports 136 through the tubular body 132. The ports establish a fluid communication path between radially spaced lateral fluid ports 108 in the housing body 100 and low pressure chambers 137 (typical). Annular grooves 138 may be collocated with the one or more ports 136 to allow fluid flow regardless of any radial misalignment between ports 136 and 108.

Each of the intermediate housing pressure chamber segments 130 contains a seal 140, or multiple seals, to prevent or minimize fluid communication between the high pressure chambers and the low pressure chambers. Seal 140 may be an O-ring type seal disposed in an annular recess 142 in the exterior of each collar 134, or may be another type of seal commonly known in the art which may or may not need to be disposed in a recess. In a preferred embodiment, seal 140 is a Kalsi seal, as discussed above. As mentioned, more than one seal may be employed on a pressure chamber segment.

Referring again to FIG. 1, near the lower end of the housing pressure chamber string 110 is a lower housing pressure chamber segment 150. The upper end of lower housing pressure chamber segment 150 abuts the lower end of the adjacent lowest intermediate pressure chamber segment 130. Lower housing pressure chamber segment 150 contains a tubular body 152 and a collar 154 that projects laterally away from the tubular body 132, inward toward the adjacent lower mandrel pressure chamber segment 48 (and away from the housing body 100). The collar 154 contains a seal 156, or seals, which may be located in an annular recess 157, and is located adjacent to, and bears upon, the lower mandrel pressure chamber segment 48 above the one or more ports 64. Accordingly, the seal is provided to prevent or minimize the transfer of high and low pressure fluids.

The inner wall of the lower housing pressure chamber segment 150 is stepped. A bleed port 158 for the high pressure fluid is collocated with the housing body bleed port 106 to allow relief of air in the high pressure fluid during the filling of the oil chamber. A lower outer radial race 160 is coupled to the lower housing pressure chamber segment 150 providing the radial bearing surface for a radial bearing such as roller bearing 72.

A sealing member 170 is slidably disposed below lower housing pressure chamber segment 150. Sealing member 170 is configured to provide sealing surfaces between the high pressure oil in the thrust bearing and the low pressure drilling fluid located outside the thrust bearing. In one embodiment, sealing member 170 contains seals 172, 174, and 176 which may be Kalsi type seals, O-ring seals, or other seals commonly known in the art. Seal 172 is located and seals between one surface of sealing member 170 and spacer ring 74. Seal 174 is located and seals between a second surface of sealing member 170 and housing body 100. Seal 176 is located and seals between another surface of sealing member 170 and lower housing pressure chamber segment 150. Additional seals may be employed.

Sealing member 170 is axially slidable, and is located between the lower housing pressure chamber segment 150 and a coupling mechanism, and this sealing member forms the lower end of the housing pressure chamber string 110. In the embodiment of FIG. 1, the coupling mechanism is a lock nut 180. Lock nut 180 is externally threaded to fixedly engage internal threads on the housing body 100. The coupling mechanism allows the outer bearing races/housing pressure chamber segments, radial races, and head member that make up the housing pressure chamber string to be axially installed inside the housing body 100 and put into compression against the housing shoulder 102 by appropriately torqueing the lock nut 180. Other embodiments are envisioned where the coupling mechanism may comprise pins, screws, welds, or other coupling methods known in the art.

A first (upper) high pressure reservoir 190 is defined by the mandrel end segment 26, the upper inner radial race 34, the upper mandrel pressure chamber segment 42, and the head member 112. In the embodiment shown in FIG. 1, an inner fill port 122 through the head member 112 is collocated with the housing body fill port 104 to allow the introduction of fluid, typically oil, into the high pressure reservoir 190. As used herein, "high pressure" is used in relation to the pressure in the adjacent chambers, meaning only that the pressure of the reservoir 190 and the "high pressure" chambers 57 is relatively higher than the pressure in the adjacent "low pressure" chambers 137.

Figure 4:
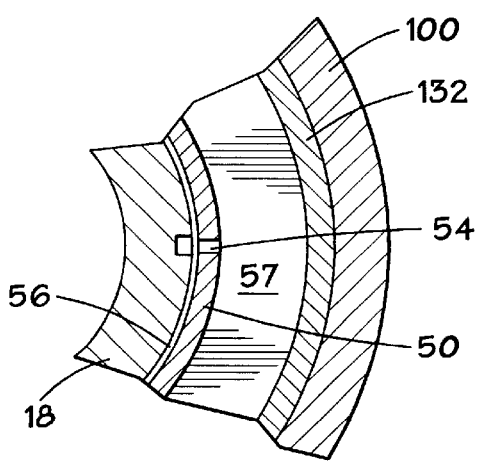
FIG. 4 is a cross-sectional view of the housing and a pressure chamber taken along line 4—4 of FIG. 2.

Inner fill port 122 contains a sealing and pressure-containing closure, which may be a threaded plug or other suitable closure device. As can be seen in FIG. 1, the high pressure fluid from reservoir 190 is in communication with the radially spaced slots 20 in mandrel body 12 through port 38 (and annular recess 40). From the radially spaced slots 20 the high pressure fluid is in communication with alternating "high" pressure chambers through annular grooves 56 and ports 54 in the upper and intermediate mandrel pressure chamber segments 42 and 46. As seen in FIGS. 1 and 4, the walls of mandrel pressure chamber segments 42 and 46, in conjunction with seals 58 and 140, define a series of sealed "high pressure" chambers 57, open only to the radially spaced slots. Finally, a second (lower) high pressure reservoir 195, accessible to fluid from the lowest end of the radially spaced slots 20, is defined by the walls of the lower housing pressure chamber segment 150, in conjunction with the slidable sealing member 170 and lower housing member seal 156.

An inner bleed port 158 is collocated with the housing body bleed port 106 to allow the release of air in the high pressure oil or other fluid from the second (lower) high pressure reservoir 195. Inner bleed port 158 contains a sealing and pressure-containing closure, which may be a threaded plug or other suitable closure device. However, because the series of pressure chambers is in compression the system is responsive to temperature changes and allows for expansion, and it is not necessary that trapped air volume within the series of high pressure chambers be completely bled off. In a preferred embodiment the entrained air in the high pressure fluid is minimized, but not fully bled off.

Figure 3:
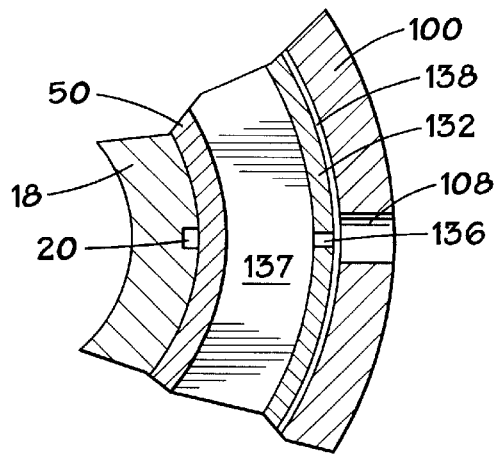
FIG. 3 is a cross-sectional view of the housing and a pressure chamber taken along line 3—3 of FIG. 2.

Alternating with the series of high pressure chambers discussed above are a series of low pressure chambers 137. Each of the plurality of radially spaced lateral fluid ports 108, through the housing body 100, is axially aligned with the annular grooves 138 and ports 136 in the intermediate housing pressure chamber segments 130, as shown in FIGS. 1 and 3. Accordingly, low pressure fluid from outside the thrust bearing is accumulated in the series of low pressure chambers 137. The alternate high and low pressure chambers act additively based on pressure differential and axial load bearing surface of the chamber to make up the thrust bearing.

In an alternate embodiment shown in FIG. 5, the outer housing body 200 is sealed. In this embodiment, the modified housing pressure chamber string 210 allows the passage of fluid through the string into the low pressure chambers 137. However, ports are not provided in the housing body 200, and thus the low pressure chambers 137 are not in communication with the outside fluids.

Specifically, each of the intermediate housing pressure chamber segments 230 contain at least one axial groove 233 which provides part of a fluid communication passageway between the low pressure chambers. In a preferred embodiment, multiple axial grooves 233 are provided in the intermediate pressure chambers segments 230, so that flow capacity is provided while minimizing the loss of wall thickness in the tubular body 232. Similarly, one or more axial grooves 253 are provided in the lower housing pressure chamber segment 250, which may also be radially spaced to minimize the reduction of wall thickness in tubular body 252. Axial grooves 233, in conjunction with ports 136 and annular grooves 138, provide a continuous flow path between low pressure chambers 137, and the path is continuous irrespective of radial alignment of axial grooves 233.

The embodiment of FIG. 5 also includes a slotted slidable sealing member 270, which provides a lower portion of the communication path between low pressure chambers 137 and a low pressure reservoir 295 by means of slot 271. Seal 174 is removed from this embodiment to allow the low pressure fluid to communicate with the low pressure reservoir 295. However, seals 172 and 176 remain, sealing off the high pressure fluid from the low pressure fluid.

In this embodiment the lower port 206 acts as an outer fill port for the low pressure reservoir 295. Coupling mechanism 280 contains an inner low pressure fill port 282. Seals 284 on each side of inner low pressure fill port 282, which may be O-ring type seals located in annular grooves 285, or other type of seals known in the art, substantially prevent the flow of fluids between the walls of the coupling mechanism 280 and the slotted slidable sealing member 270 above or below the ports 206 and 282. Coupling mechanism 280 may contain an externally threaded portion with threads mating to internal threads on the housing body 200, or may comprise a lock nut, pins, screws, welds, or other coupling methods known in the art, and/or may be comprised of multiple sections. The coupling mechanism 280 allows the housing pressure chamber segments, radial races, and head member that make up the housing pressure chamber string to be axially installed inside the housing body 200 and put into compression.

Coupling mechanism 280 also contains a shoulder 286 which defines a lower limit of travel for a floating piston 300 disposed between the housing coupling mechanism 280 and the mandrel lock nut 80. Below floating piston 300 a drilling fluid return chamber 302 is defined, which is open to the flow of drilling returns and is subject to the same pressure. Floating piston 300 contains seals to separate the drilling return fluid in chamber 302 from the low pressure oil or other fluid contained in the low pressure reservoir 295. In one embodiment, a pair of radial seals 304 is provided however, many embodiments of floating pistons and seals are known in the art and could be used for separating the fluids while allowing adjustment to the external pressure. In the embodiment shown, the upper limit of travel for the floating piston 300 is a ring 310, held in compression against spacer ring 74. A bushing 312, similar to bushing 29, may be provided.

Low pressure reservoir 295 contains a fluid, typically an oil. Because of the action of floating piston 300, which is responsive to the surrounding pressure at the thrust bearing's location in the drill string, the pressure in reservoir 295 and the low pressure chambers 137 it communicates with is essentially equal to the external fluid pressure, and in nay case lower than the pressure in the "high pressure" chambers 57.

In the embodiment of FIG. 5, the fill port 122 to the upper high pressure reservoir 190 provides the start point for communication with the radially spaced slots or channels 20, the series of high pressure chambers 57, and the lower reservoir 195. However, in the embodiment shown there is no bleed port for the high pressure oil. Alternately, the sealed thrust bearing may contain two fill ports and two bleed ports, one each for high pressure fluid and for low pressure fluid.

By sealing the low pressure chambers 137 (the outer chambers in the embodiment shown) from the drilling fluid returns, the possibility of cuttings, solid particles, or other debris in the drilling returns getting into the thrust bearing 10 is reduced. This is especially beneficial when the thrust bearing is applied at the lower portion of the drill string, closer to the drill bit, such as in mud motor applications. However, in applications where the presence of cuttings or debris is not considered an issue, the floating piston may be eliminated, opening the passageways to the low pressure chambers to the flow of the drilling fluid returns, or, alternatively, the previously discussed embodiment with ports through the housing may be used.

Operation of the Thrust Bearing

As an example, in the illustrative embodiment of FIG. 1, there are ten pressure chambers. The bearing area of the pressure chambers is a factor of the difference between the outside diameter of an inner race (noted as A in FIG. 1) and the inside diameter of an outer race (noted as B in FIG. 1), which together form the boundaries of a pressure chamber. Accordingly, assume the radius from the centerline of inner bore 16 to the inside edge of a pressure chamber is 2.375 inches, and the radius from the centerline of inner bore 16 to the outside edge of a pressure chamber 3.25 inches. The resultant differential area is the axial load bearing surface formed by each of the chambers, in this example 15.46 sq. in. Assuming a differential pressure between the low pressure drilling fluid and the high pressure oil of 1000 psi (and assuming this to be the pressure differential in either the sealed or unsealed embodiments), for ten chambers the additive load bearing capacity of the thrust bearing is 154,600 lbs. (15.46 sq. in.×1,000 psi×10)

Knowing the axial loads expected, and the outside and inside diameters allowed by operating equipment and conditions, one of ordinary skill can define the appropriate size and number of the pressure chambers. The thrust bearing can then be assembled and prepared for installation in the drill pipe string.

The relatively high pressure chambers 57 containing the oil are filled through the fill port 122. As the oil flows through the upper high pressure reservoir 190, the radially spaced slots or channels 20 which communicate with the series of high pressure chambers 57, and the lower reservoir 195, air in the initially assembled device is forced out through the open bleed port 158. It is not necessary that all of the air be bled off, as long as the air volume remaining when the bearing is run with the drill string is minimal. In the sealed embodiment the high pressure chambers can be filled in this manner, or in the embodiment shown in FIG. 5 by filling with oil and bleeding out air through the same ports.

The thrust bearing of FIG. 1 can be installed in a drill string to define an upper drill string portion and a lower drill string portion (as shown in FIG. 6). The upper portion of the drill string may be releasably connected to the inner component 12, or the outer component 14, and in either case will be driven by rotation of the drill string from the surface. In normal operation torque transmitted to the driven component is transferred to the non-driven component, and both the upper and lower drill string components rotate. However, if the lower drill string component becomes stuck, or if rotation of the lower portion is restricted, a clutch or torque limiter may be operated to disengage the torque transfer mechanism.

With the upper portion of the drill string rotating, to prevent it from sticking as well, the lower portion of the drill string can now be jarred.

Although all of the chambers have been shown the same size for simplicity, varying the size of the chambers may be advantageous in certain situations and is considered within the scope of the invention. Moreover, the description and several embodiments of the present invention are intended as examples of some embodiments of the invention and not as limitations. Many variations may be made to the embodiments disclosed without departing from the scope and spirit of the present invention. For example, while the above description is directed to specific oilfield drilling application in a drill string, the present invention is applicable to many other forms of axial thrust bearing. In addition, the thrust bearing of the current invention may also be used as part of a mud motor, particularly with the embodiment of FIG. 5 which includes an outer sleeve. The present invention is intended to be limited only by the scope and spirit of the following claims.

What is claimed is:

1. A thrust bearing comprising:
   housing;
   a mandrel;
   a plurality of pressure bearing chambers axially journalled between the mandrel and the housing, such that there is a series of relatively low pressure chambers adjacent to, and alternating with, a series of relatively high pressure chambers, the relatively low pressure chambers being in slidable relation to the relatively high pressure chambers;
   a plurality of first pressure chamber segments comprised of a tubular body and an outwardly extending collar, the outwardly extending collar containing at least one seal, the plurality of first pressure chamber segments adjacent an exterior surface of the mandrel;
   a plurality of second pressure chamber segments comprised of a tubular body and an inwardly extending collar, the inwardly extending collar containing at least one seal, the plurality of second pressure chamber segments adjacent an interior surface of the housing;
   at least one seal on each outwardly extending collar of each of the plurality of first pressure chamber segments sealingly adjoining the tubular body of each of the plurality of second pressure chamber segments;
   at least one seal on each inwardly extending collar of each of the plurality of second pressure chamber segments sealingly adjoining the tubular body of each of the plurality of first pressure chamber segments;
   at least one high pressure port extending through each of the plurality of first pressure chamber segments and in fluid communication with relatively high pressure fluid.

2. The thrust bearing of claim 1 further comprising at least one low pressure port extending through each of the plurality of second pressure chamber segments and in fluid communication with relatively low pressure fluid.

3. The thrust bearing of claim 2 wherein the relatively low pressure fluid is maintained at approximately the pressure of fluid outside of the thrust bearing.

4. The thrust bearing of claim 1 wherein the plurality of first pressure chamber segments is held in compression against a first shoulder of the mandrel, and the plurality of second pressure chamber segments is held in compression against a first shoulder of the housing.

5. The thrust bearing of claim 1 further comprising one or more radially spaced longitudinal slots in the mandrel, and wherein the at least one high pressure port is collocated with a radial groove in a wall of the first pressure chamber segments adjacent the mandrel, to allow fluid communication between the radially spaced longitudinal slots and the radial groove.

6. A rotating assembly comprising:
   a first tubular component having an interior bore, a first exterior shoulder, and at least one exterior channel;
   a plurality of first axial races, each of the first axial races having at least one port in communication with the exterior channel of the first tubular element, and having an outwardly projecting collar;
   a second tubular component having an interior bore, a first internal shoulder, and a plurality of ports along its longitudinal axis;
   a plurality of second axial races journalled between the plurality of first axial races and the second tubular component, each of the second axial races having at least one port in communication with at least one of the plurality of ports in the second tubular component, and having an inwardly projecting collar located alternately spaced between the outwardly projecting collars of the plurality of first axial races;
   seals disposed between the plurality of first axial races and the plurality of second axial races.

7. The assembly of claim 6 further comprising a first coupling member located to compress the plurality of first axial races against the first exterior shoulder of the first tubular component, and a second coupling member located to compress the plurality of second axial races against the first internal shoulder of the second tubular component.

8. The assembly of claim 7 further comprising at least one radial bearing journalled between the plurality of first axial races and the plurality of second axial races.

9. The assembly of claim 6 further comprising at least one radial bearing journalled between the first tubular component and the second tubular component.

10. The assembly of claim 6 further comprising a sealable fill port located proximate a first end of the plurality of first axial races, and a sealable bleed port located at a distal end of the plurality of first axial races.

11. The assembly of claim 10 further comprising seals disposed between at least one of the plurality of first axial races and the first tubular component, and between at least one of the plurality of second axial races and the second tubular component, proximate the fill port and the bleed port to substantially prevent the flow of fluid beyond the assembly.

12. The assembly of claim 11 wherein a substantially sealed fluid chamber is defined by the exterior channel in the first tubular component and a plurality of sealed chambers between the first axial races and the second axial races, and further comprising a fluid within the substantially sealed fluid chamber.

13. The assembly of claim 12 wherein the fluid is oil.

14. The assembly of claim 12 wherein the fluid is at a high pressure relative to the pressure outside of the sealed chamber.

15. The assembly of claim 6 wherein at least one of the ports in the plurality of first axial races is collocated with a radial groove.

16. The assembly of claim 6 wherein at least one of the ports in the plurality of second axial races is collocated with a radial groove.

17. A thrust bearing for use in a subsea drilling string comprising:

a mandrel body having at least one shoulder and at least one axial groove;

a plurality of mandrel pressure chamber segments journalled around the mandrel body between the mandrel body shoulder and a first coupling mechanism, each of the mandrel pressure chambers segments having a body with at least one port therethrough, and a collar extending laterally from the body;

a housing having at least one shoulder, and at least first and second ports extending through the housing;

a plurality of housing pressure chamber segments each having a body with at least one port therethrough, and a collar extending laterally from the body, the plurality of housing pressure chamber segments journalled between the plurality of mandrel pressure chamber segments and the housing such that the collar of at least one mandrel pressure chamber segment abuts the body of at least one housing pressure chamber segment, and the collar of at least one housing pressure chamber segment abuts the body of at least one mandrel pressure chamber segment;

seals disposed between each abutting collar and body of the mandrel and housing pressure chamber segments;

a second coupling mechanism holding the plurality of housing pressure chamber segments proximate the at least one housing;

a first reservoir located proximate the first port through the housing, the first port through the housing in fluid communication with the at least one axial groove, the ports through the plurality of mandrel pressure chamber segments, and a series of first pressure chambers, each of the first pressure chambers defined by each mandrel pressure chamber segment collar sealingly abutting each housing pressure chamber segment body below each of the ports through the plurality of mandrel pressure chamber segments, and a second reservoir located away from the first port through the housing, and;

a sealing member disposed between the second reservoir and the coupling mechanism.

18. The thrust bearing of claim 17 further comprising a roller bearing disposed between the housing and the mandrel.

19. The thrust bearing of claim 18 wherein the second port in the housing is located adjacent the second reservoir, and wherein air in the first pressure chamber segments may be bled off through the second port during an introduction of fluid through the first port.

* * * * *